United States Patent
Sukumar (10) Patent No.: US 9,423,871 B2
(45) Date of Patent: Aug. 23, 2016

(54) SYSTEM AND METHOD FOR REDUCING THE EFFECTS OF INADVERTENT TOUCH ON A TOUCH SCREEN CONTROLLER

(75) Inventor: Sharath Sukumar, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 582 days.

(21) Appl. No.: 13/568,959

(22) Filed: Aug. 7, 2012

(65) Prior Publication Data

US 2014/0043241 A1   Feb. 13, 2014

(51) Int. Cl.
G06F 3/041 (2006.01)
G06F 3/01 (2006.01)
G06F 3/0488 (2013.01)

(52) U.S. Cl.
CPC ............. G06F 3/013 (2013.01); G06F 3/0418 (2013.01); G06F 3/04886 (2013.01); B60K 2350/1028 (2013.01); B60K 2350/1052 (2013.01)

(58) Field of Classification Search
CPC ........... G06F 3/01; G06F 3/011; G06F 3/041; G06F 3/013
USPC ....................................................... 345/173
See application file for complete search history.

(56) References Cited

U.S. PATENT DOCUMENTS

| 5,128,672 A | 7/1992 | Kaehler |
|---|---|---|
| 5,689,619 A | 11/1997 | Smyth |
| 5,764,222 A | 6/1998 | Shieh |
| 5,870,083 A | 2/1999 | Shieh |
| 5,956,020 A | 9/1999 | D'Amico et al. |
| 6,160,536 A | 12/2000 | Forest |
| 6,181,328 B1 | 1/2001 | Shieh et al. |
| 6,459,424 B1 | 10/2002 | Resman |
| 6,636,897 B1 | 10/2003 | Sherman et al. |
| 6,831,631 B2 | 12/2004 | Chuang |
| 7,176,902 B2 | 2/2007 | Peterson, Jr. et al. |
| 7,289,102 B2 | 10/2007 | Hinckley et al. |
| 7,295,191 B2 | 11/2007 | Kraus et al. |
| 7,411,575 B2 | 8/2008 | Hill et al. |
| 7,489,303 B1 | 2/2009 | Pryor |
| 7,561,143 B1 | 7/2009 | Milekic |
| 7,693,869 B2 | 4/2010 | Hutson et al. |

(Continued)

FOREIGN PATENT DOCUMENTS

| CN | 101794179 A | 8/2010 |
|---|---|---|
| EP | 2077490 A2 | 7/2009 |

(Continued)

OTHER PUBLICATIONS

USPTO Office Action for U.S. Appl. No. 13/162,679; Notification date Jan. 14, 2014.

(Continued)

*Primary Examiner* — Srilaskshmi K Kumar
*Assistant Examiner* — Carl Adams
(74) *Attorney, Agent, or Firm* — Ingrassia Fisher & Lorenz, P.C.

(57) ABSTRACT

A method and system are provided for determining if a control button on a touch screen controller (TSC) was inadvertently touched. A user gaze point is determined using gaze detection apparatus, and the level of functional significance of the control button is identified. User gaze boundary values for the control button are then determined, and the gaze boundary values are altered to reflect the level of functional significance.

19 Claims, 7 Drawing Sheets

(56) References Cited

U.S. PATENT DOCUMENTS

| | | | |
|---|---|---|---|
| 7,730,401 B2 | 6/2010 | Gillespie et al. | |
| 7,782,307 B2 | 8/2010 | Westerman et al. | |
| 7,834,855 B2 | 11/2010 | Hotelling et al. | |
| 7,847,789 B2 | 12/2010 | Kolmykov-Zotov et al. | |
| 7,895,522 B2 | 2/2011 | Wong et al. | |
| 8,018,440 B2 | 9/2011 | Townsend et al. | |
| 8,085,252 B1 | 12/2011 | Lee et al. | |
| 8,136,053 B1 | 3/2012 | Miller et al. | |
| 8,471,783 B2* | 6/2013 | Rhodes | G02B 27/017 345/1.2 |
| 2004/0150626 A1 | 8/2004 | Husman et al. | |
| 2004/0212601 A1 | 10/2004 | Cake et al. | |
| 2004/0218830 A1* | 11/2004 | Kang | G06T 5/50 382/274 |
| 2004/0234107 A1 | 11/2004 | Machida et al. | |
| 2005/0017957 A1 | 1/2005 | Yi | |
| 2005/0243054 A1 | 11/2005 | Beymer et al. | |
| 2006/0161871 A1 | 7/2006 | Hotelling et al. | |
| 2006/0221061 A1 | 10/2006 | Fry | |
| 2006/0279548 A1 | 12/2006 | Geaghan | |
| 2007/0152976 A1 | 7/2007 | Townsend et al. | |
| 2007/0268269 A1 | 11/2007 | Chang et al. | |
| 2007/0273671 A1 | 11/2007 | Zadesky et al. | |
| 2008/0042988 A1 | 2/2008 | Westerman et al. | |
| 2008/0100586 A1 | 5/2008 | Smart | |
| 2008/0158146 A1 | 7/2008 | Westerman | |
| 2008/0165154 A1 | 7/2008 | Kim | |
| 2008/0284739 A1 | 11/2008 | Andrews et al. | |
| 2009/0058819 A1 | 3/2009 | Gioscia et al. | |
| 2009/0082107 A1 | 3/2009 | Tahara et al. | |
| 2009/0085894 A1 | 4/2009 | Gandhi et al. | |
| 2009/0156363 A1 | 6/2009 | Guidi et al. | |
| 2009/0174676 A1 | 7/2009 | Westerman | |
| 2009/0174679 A1 | 7/2009 | Westerman | |
| 2009/0244032 A1 | 10/2009 | Westerman et al. | |
| 2009/0251432 A1 | 10/2009 | Wang et al. | |
| 2009/0262089 A1 | 10/2009 | Wang | |
| 2009/0273571 A1 | 11/2009 | Bowens | |
| 2009/0296988 A1* | 12/2009 | Yamazaki | G06F 3/013 382/103 |
| 2009/0322683 A1 | 12/2009 | Tsuji et al. | |
| 2009/0322687 A1 | 12/2009 | Duncan et al. | |
| 2010/0020038 A1 | 1/2010 | Vogel et al. | |
| 2010/0053095 A1 | 3/2010 | Wu et al. | |
| 2010/0100849 A1 | 4/2010 | Fram | |
| 2010/0115473 A1 | 5/2010 | Reeves et al. | |
| 2010/0127995 A1 | 5/2010 | Rigazio et al. | |
| 2010/0146459 A1 | 6/2010 | Repka | |
| 2010/0146463 A1 | 6/2010 | Cho et al. | |
| 2010/0149130 A1 | 6/2010 | Jung et al. | |
| 2010/0156795 A1 | 6/2010 | Kim et al. | |
| 2010/0169766 A1* | 7/2010 | Duarte | G06F 3/04883 715/244 |
| 2010/0188352 A1* | 7/2010 | Ikeda | G06F 3/0486 345/173 |
| 2010/0188371 A1 | 7/2010 | Lowles et al. | |
| 2010/0194713 A1 | 8/2010 | Kawashima et al. | |
| 2010/0207894 A1 | 8/2010 | Tsuei | |
| 2010/0225595 A1* | 9/2010 | Hodges | G06F 3/0425 345/173 |
| 2010/0235793 A1 | 9/2010 | Ording et al. | |
| 2010/0245258 A1 | 9/2010 | Stewart et al. | |
| 2010/0269040 A1 | 10/2010 | Lee | |
| 2010/0273533 A1 | 10/2010 | Cho | |
| 2010/0280753 A1 | 11/2010 | Chytil et al. | |
| 2010/0289759 A1 | 11/2010 | Fisher et al. | |
| 2010/0289768 A1 | 11/2010 | Nakao | |
| 2010/0315267 A1 | 12/2010 | Chung et al. | |
| 2010/0315371 A1 | 12/2010 | Katsu et al. | |
| 2011/0006996 A1 | 1/2011 | Smith et al. | |
| 2011/0012855 A1 | 1/2011 | Yeh et al. | |
| 2011/0037705 A1 | 2/2011 | Yilmaz | |
| 2011/0074544 A1 | 3/2011 | D'Souza | |
| 2011/0090169 A1 | 4/2011 | Karhiniemi | |
| 2011/0157172 A1* | 6/2011 | Bennett | G06F 3/14 345/419 |
| 2011/0175932 A1 | 7/2011 | Yu et al. | |
| 2011/0187651 A1 | 8/2011 | Whitlow et al. | |
| 2011/0187661 A1 | 8/2011 | Wakizaka et al. | |
| 2011/0199327 A1 | 8/2011 | Shin et al. | |
| 2011/0210926 A1 | 9/2011 | Pasquero et al. | |
| 2011/0214162 A1 | 9/2011 | Brakensiek et al. | |
| 2011/0227872 A1 | 9/2011 | Huska et al. | |
| 2011/0254798 A1 | 10/2011 | Adamson et al. | |
| 2011/0271216 A1 | 11/2011 | Wilson | |
| 2011/0285645 A1 | 11/2011 | Cho et al. | |
| 2011/0291944 A1 | 12/2011 | Simmons et al. | |
| 2011/0291948 A1 | 12/2011 | Stewart et al. | |
| 2011/0291985 A1 | 12/2011 | Wakako et al. | |
| 2011/0310001 A1 | 12/2011 | Madau et al. | |
| 2011/0316807 A1 | 12/2011 | Corrion | |
| 2012/0011438 A1 | 1/2012 | Kim et al. | |
| 2012/0013570 A1 | 1/2012 | Murata | |
| 2012/0021806 A1* | 1/2012 | Maltz | H04W 4/20 455/566 |
| 2012/0022720 A1 | 1/2012 | Deleris et al. | |
| 2012/0036445 A1 | 2/2012 | Ganille et al. | |
| 2012/0105486 A1 | 5/2012 | Lankford et al. | |
| 2012/0154293 A1 | 6/2012 | Hinckley et al. | |
| 2012/0242591 A1 | 9/2012 | Kawalkar | |
| 2012/0254808 A1 | 10/2012 | Gildfind | |
| 2013/0097566 A1 | 4/2013 | Burglund | |
| 2013/0100043 A1 | 4/2013 | Kolbe | |
| 2013/0113719 A1 | 5/2013 | Griffin et al. | |
| 2013/0249809 A1 | 9/2013 | Kawalkar et al. | |
| 2013/0254692 A1 | 9/2013 | Han | |
| 2014/0043241 A1 | 2/2014 | Sukumar | |
| 2014/0082534 A1 | 3/2014 | Cleron et al. | |
| 2014/0160048 A1 | 6/2014 | Conway et al. | |
| 2014/0164983 A1 | 6/2014 | Kawalkar et al. | |

FOREIGN PATENT DOCUMENTS

| | | | |
|---|---|---|---|
| EP | 2330487 A1 | 6/2011 | |
| JP | 10333737 A | 12/1998 | |
| JP | 10333737 A1 | 12/1998 | |
| JP | 2002287889 A | 10/2002 | |
| JP | 2009025858 A | 2/2009 | |
| JP | 2009217814 A | 9/2009 | |
| TW | 201030592 A1 | 8/2010 | |
| WO | 2005064587 A2 | 7/2005 | |
| WO | 2007107700 A2 | 9/2007 | |
| WO | 2010040207 A1 | 4/2010 | |
| WO | 2010090033 A1 | 8/2010 | |

OTHER PUBLICATIONS

USPTO Notice of Allowance for U.S. Appl. No. 13/162,679 dated Feb. 24, 2014.

Kawalkar, A. N.: Touch Screen and Method for Providing Stable Touches, filed with the USPTO on Jun. 17, 2011 and assigned U.S. Appl. No. 13/162,679.

Kawalkar, A. N.: Touch Screen Display User Interface and Method for Improving Touch Interface Utility on the same Employing a Rules-Based Masking System, filed with the USPTO on Mar. 22, 2012 and assigned U.S. Appl. No. 13/427,336.

Himberg J., et al.; On-line Personalization of a Touch Screen Based Keyboard.

Simpson, R., et al.; Research in Computer Access Assessment and Intervention, NIH Public Access Author Manuscript, Phys Med Rehabil Clin N Am. Feb. 2010; 21(1): 15-32. doi:10.1016/j.pmr2009.07.006.

Kawalkar A. N.: System and Method for Reducing the Probability of Accidental Activation of Control Functions on a Touch Screen, filed with the USPTO on Aug. 28, 2012 and assigned U.S. Appl. No. 13/597,021.

Kawalkar, A. N., et al.: "System and Method for Interacting With a Touch Screen Interface Utilizing an Intelligent Stencil Mask" filed with the USPTO on and assigned U.S. Appl. No. 13/708,320, filed Dec. 7, 2012.

USPTO Final Office Action, Notification Date Jul. 7, 2014; U.S. Appl. No. 13/427,336.

(56) References Cited

OTHER PUBLICATIONS

USPTO Office Action for U.S. Appl. No. 13/708,320 dated Aug. 28, 2014.
USPTO Office Action for U.S. Appl. No. 13/427,336 dated Dec. 4, 2014.
USPTO Notice of Allowance, Notification date Dec. 23, 2014; U.S. Appl. No. 13/708,320.
USPTO Office Action, Notification date Dec. 24, 2014; U.S. Appl. No. 13/597,021.
USPTO Final Office Action, Notification date Apr. 8, 2015; U.S. Appl. No. 13/597,021.
USPTO Final Office Action, Notification date May 7, 2015; U.S. Appl. No. 13/427,336.
USPTO Office Action for U.S. Appl. No. 13/427,336 dated Sep. 29, 2015.
JP Office Action for Application No. JP 2012-067414, dated Feb. 16, 2016.
TW Office Action for Application No. TW 11110261 dated Feb. 23, 2016.
EP Search Report for Application EP13177917.5 dated Mar. 16, 2016.
Li, Xiaoxun et al., "A Comparison of SAE ARP 4754A and ARP 4754," vol. 17, Nov. 30, 2011.
USPTO Final Office Action, Notification Date Feb. 26, 2016; U.S. Appl. No. 13/427,336.
EP Examination Report for Application No. EP 12160824.4-1507 dated Nov. 5, 2016.
EP Search Report for Application No. EP 12160824.4 dated Apr. 25, 2016.
EP Examination Report for Application No. 13177917.5-1959 dated Mar. 29, 2016.
CN Office Action for Application No. 201210161700 dated Feb. 1, 2016.
Xiaoxun, L et al.; A Comparison of SAE ARP 4754A and ARP 4754; SciVerse Science Direct; The 2nd International Symposium on Aircraft Airworthiness (ISAA 2011).

* cited by examiner

SYSTEM AND METHOD FOR REDUCING THE EFFECTS OF INADVERTENT TOUCH ON A TOUCH SCREEN CONTROLLER

TECHNICAL FIELD

Embodiments of the subject matter described herein relate generally to vehicular display systems. More particularly, embodiments of the subject matter described herein relate to a system and method for reducing inadvertent touch and the effects thereof on a cockpit touch screen controller (TSC).

BACKGROUND

While touch screen controllers are being introduced as components of modern flight deck instrumentation, they are constrained by the problems associated with inadvertent touch, which may be defined as any system detectable touch issued to the touch sensors without the pilot's operational consent. That is, a pilot may activate touch screen control buttons inadvertently because of turbulence, vibrations, or aspects of the pilot's physical and cognitive workload, resulting in possible system malfunction or operational error. For example, potential sources of inadvertent touches include accidental brush by a pilot's hand or other physical object while the pilot is not interacting with the touch screen controller; e.g. touch resulting when moving across the flight deck or involuntary movements (jerks) induced by turbulence. Accidental activation may also be caused by a pilot's non-interacting fingers or hand portions. Furthermore, environmental factors may also result in inadvertent touching depending on the touch technology employed; e.g. electromagnetic interference in the case of capacitive technologies, or insects, sunlight, pens, clipboards, etc., in the case of optical technologies. Apart from the above described side effects associated with significant control functions, activation of even less significant control functions degrades the overall functionality of touch screen interfaces.

One known approach for reducing inadvertent TSC touch involves estimating the intent of the user to activate a particular control button by tracking the user's gaze or head movement. This approach operates under the assumption that if the user is gazing or looking toward the TSC, then it is likely that the user is aware of the action being performed by the user's hand. Unfortunately, such systems do not differentiate between a control button that operates a significant avionics system (e.g. engaging the auto-throttle) and a control button that is associated with a less significant function (e.g. a camera video display). Simply stated, the significance of the functionality or system being impacted by an inadvertent TSC touch may range from a mere inconvenience to a possible safety issue. If a stringent eye gaze or head position tracking method is employed for highly significant TSC control buttons and control buttons of less significance, there will result unnecessary expense from a performance point of view. On the other hand, if a lenient eye gaze or head position tracking approach is taken for control buttons that operate significant and less significant functions, the operation of the significant functions could be compromised.

In view of the foregoing, it would be desirable to provide a system and method for reducing inadvertent touch on a TSC utilizing pilot or user gaze information to mitigate the inadvertent touch of a control button on a TSC considering the relative significance of the function or the avionics system operated by the control button. It would also be desirable to provide novel apparatus and methods for estimating the attention of the user or pilot using the point of eye gaze technique.

BRIEF SUMMARY

This summary is provided to introduce a selection of concepts in a simplified form that are further described below in the detailed description. This summary is not intended to identify key or essential features of the claimed subject matter, nor is it intended to be used as an aid in determining the scope of the appended claims.

A method is provided for determining if a control button on a touch screen controller (TSC) has been inadvertently touched. The method comprises determining a user gaze point, identifying the level of functional significance of the control button, determining user gaze boundary values for the control button, and altering the gaze boundary values to reflect the level of functional significance.

Also provided is a system for determining if the user has inadvertently touched a control button of a touch screen. The system comprises a gaze detection system that detects the user's gaze point and a control button identifier coupled to the gaze detecting system; a button significance look-up table coupled to the control button identifier. The system also comprises a processor coupled to the gaze detection system, the control button identifier, and to the button significance look-up table, and configured to (1) determine a user's gaze boundary values, (2) identify the level of significance of the control button; and (3) alter the user's gaze boundary values to reflect the level of functional significance of the button.

Furthermore, a method for determining if a control button on a touch screen controller (TSC) was inadvertently touched is provided and comprises determining user gaze point, identifying the level of functional significance of the control button, determining user gaze boundary values for the control button, altering the gaze boundary values to reflect the level of functional significance, determining if gaze point is within the gaze boundary, and creating a button enabling signal if the gaze point is within the gaze boundary.

BRIEF DESCRIPTION OF THE DRAWINGS

A more complete understanding of the subject matter may be derived by referring to the detailed description and claims when considered in conjunction with the following figures, wherein like reference numerals refer to similar elements throughout the figures, and wherein:

DETAILED DESCRIPTION

The following detailed description is merely exemplary in nature and is not intended to limit the invention or its application and uses. Furthermore, there is no intention to be bound by any theory presented in the preceding background or the following detailed description.

There will be described below, a system and method to adaptively use pilot or user gaze data to mitigate the inadvertent touch of a control button on a TSC as a function of the avionics system operated by the control button. In addition, there will be described three methods for estimating the degree of attention being given by a pilot or user in accordance with a set of boundary values for gaze focus. In a first method, user gaze is bounded by a stochastic area defined around the button label or otherwise associated with the control button. In a second method, user gaze is bound by a rectangular, circular, or other shaped area defined within the control button. In a third method, user gaze is defined by a defined dwell time on a predetermined area or point on the control button.

As mentioned to previously, the bounding requirement of eye gaze will be adapted based of the significance level of the function or system that is operated by each of the buttons on the TSC. Each button has a defined level of significance based on the extent to which the aircraft or flight crew is effected by the inadvertent activation or deactivation of the function associated with each button as a result of an inadvertent touch. Federal aviation regulations define four levels of significance ranging from level A to level D wherein level A is the most significant and level D is the least significant. For example, the significance of a touch screen interface button that engages the aircraft's auto throttle will certainly be greater than one that opens a radio page on a multifunction display. Thus, the following embodiments contemplate a system and method that varies the gaze boundary to (1) enable and disable a TSC control button based of the significance of the function or system operated by the button, and (2) produce a tight boundary (i.e. area, time, etc.) for highly significant buttons and progressively looser boundaries for buttons of decreasing significance.

Eye gaze is filtered by (1) defining a stochastic bounding area around a control button's label within which the user's eye gaze must be to enable the associated button; (2) defining a rectangular or circular bounding area within a control button within which a user's eye gaze must be to enable the associated button; or (3) defining a dwell point and time at which point a user's gaze must be for a predetermined period of time to enable the associated button. The result is a high degree of precaution to eliminate inadvertent touch for highly significant buttons and better performance for less significant buttons.

Figure 1:
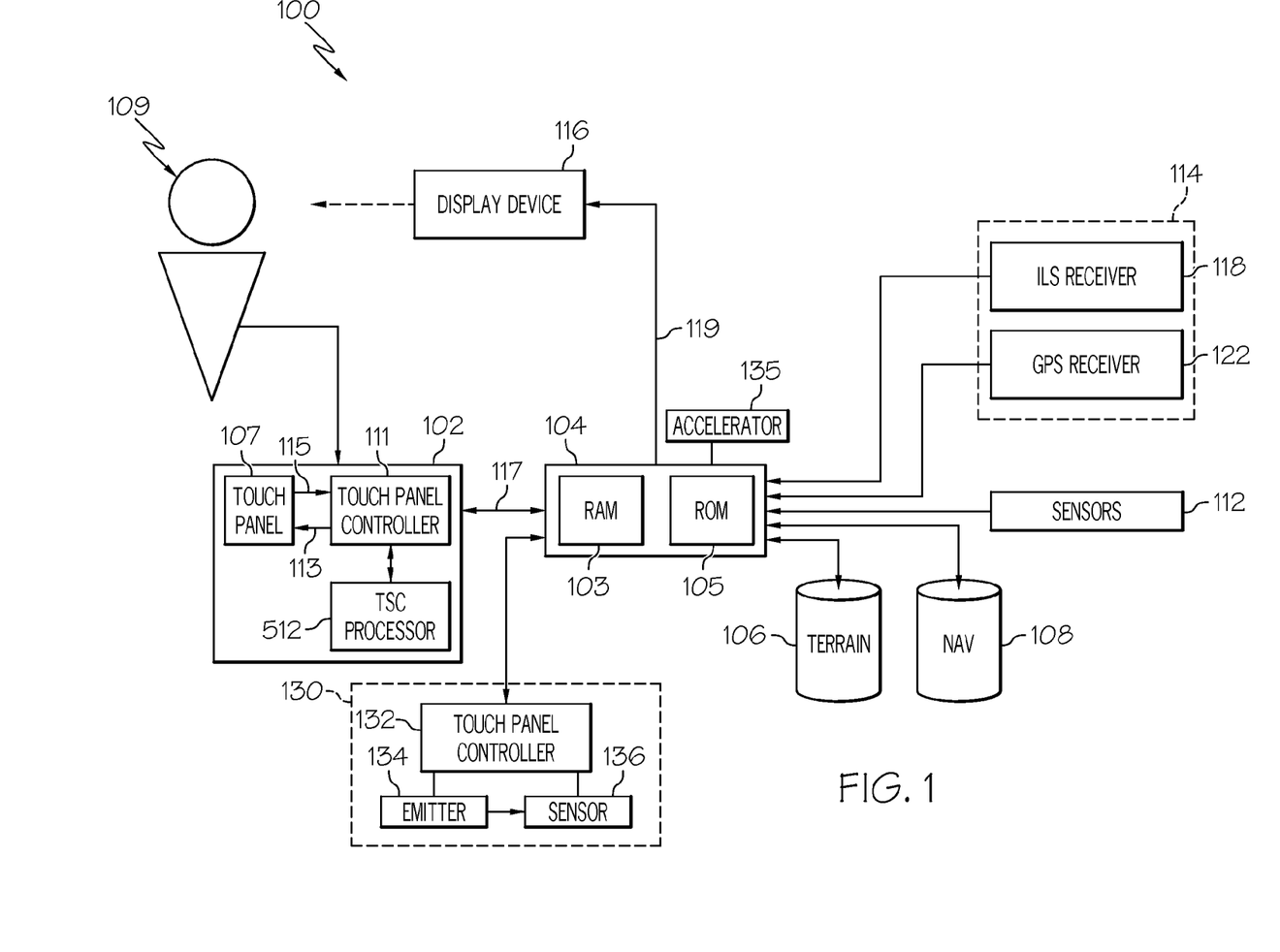
FIG. 1 is a block diagram of an aircraft cockpit display system including a touch screen display and a touch screen controller.

Though the method and touch screen of the exemplary embodiments may be used in any type of vehicle, for example, trains and heavy machinery, automobiles, trucks, and water craft, the use in an aircraft cockpit display system will be described as an example. Referring to FIG. 1, a flight deck display system 100 includes a user interface 102, a processor 104, one or more terrain databases 106 sometimes referred to as a Terrain Avoidance and Warning System (TAWS), one or more navigation databases 108, sensors 112, external data sources 114, and one or more display devices 116. The user interface 102 is in operable communication with the processor 104 and is configured to receive input from a user 109 (e.g., a pilot) and, in response to the user input, supplies command signals to the processor 104. The user interface 102 may be any one, or combination, of various known user interface devices including, but not limited to, one or more buttons, switches, or knobs (not shown). In the depicted embodiment, the user interface 102 includes a touch screen display 107, a touch screen controller (TSC) 111, and a TSC processor 512 (discussed in connection with FIG. 9 hereinbelow). The TSC 111 provides drive signals 113 to a touch screen display 107, and a sense signal 115 is provided from the touch screen display 107 to the touch screen controller 111, which periodically provides a control signal 117 of the determination of a touch to the processor 104. The processor 104 interprets the controller signal 117, determines the application of the digit on the touch screen 107, and provides, for example, a controller signal 117 to the touch screen controller 111 and a signal 119 to the display device 116. Therefore, the user 109 uses the touch screen 107 to provide an input as more fully described hereinafter. Furthermore, the flight deck system 100 includes a gaze detecting system 130 comprising a gaze tracking controller 132 coupled between the processor 104 and each of an emitter 134 and a sensor 136, and in other exemplary embodiments, an accelerator 135.

The processor 104 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. In the depicted embodiment, the processor 104 includes on-board RAM (random access memory) 103, and on-board ROM (read-only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. The software executing the exemplary embodiment is stored in either the ROM 105 or the RAM 103. It will be appreciated that this is merely exemplary of one scheme for storing operating system software and software routines, and that various other storage schemes may be implemented.

The memory 103, 105 may be realized as RAM memory, flash memory, EPROM memory, EEPROM memory, registers, a hard disk, a removable disk, a CD-ROM, or any other form of storage medium known in the art. In this regard, the memory 103, 105 can be coupled to the processor 104 such that the processor 104 can read information from, and write information to, the memory 103, 105. In the alternative, the memory 103, 105 may be integral to the processor 104. As an example, the processor 104 and the memory 103, 105 may reside in an application specific integrated circuit (ASIC). In practice, a functional or logical module/component of the display system 100 might be realized using program code that is maintained in the memory 103, 105. For example, the memory 103, 105 can be used to store data utilized to support the operation of the display system 100, as will become apparent from the following description.

No matter how the processor 104 is specifically implemented, it is in operable communication with the terrain databases 106, the navigation databases 108, and the display devices 116, and is coupled to receive various types of inertial data from the sensors 112, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display devices 116. The display devices 116, in response to the display commands, selectively render various types of textual, graphic, and/or iconic information.

The terrain databases 106 include various types of data representative of the terrain over which the aircraft is flying, and the navigation databases 108 include various types of navigation-related data. The sensors 112 may be implemented using various types of inertial sensors, systems, and or subsystems, now known or developed in the future, for supplying various types of inertial data, for example, representative of the state of the aircraft including aircraft speed, heading, altitude, and attitude. The ILS 118 provides aircraft with horizontal (or localizer) and vertical (or glide slope) guidance just before and during landing and, at certain fixed points, indicates the distance to the reference point of landing on a particular runway. The GPS receiver 124 is a multichannel receiver, with each channel tuned to receive one or more of the GPS broadcast signals transmitted by the constellation of GPS satellites (not illustrated) orbiting the earth.

The display devices 116, as noted above, in response to display commands supplied from the processor 104, selectively render various textual, graphic, and/or iconic information, and thereby supplies visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat screen displays such as various types of LCD (liquid crystal display) and TFT (thin film transistor) displays. The display devices 116 may additionally be implemented as a screen mounted display, or any one of numerous known technologies. It is additionally noted that the display devices 116 may be configured as any one of numerous types of aircraft flight deck displays. For example, it may be configured as a multi-function display, a horizontal situation indicator, or a vertical situation indicator, just to name a few. In the depicted embodiment, however, one of the display devices 116 is configured as a primary flight display (PFD).

In operation, the display device 116 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display device 116 is suitably designed to process data obtained from the sources of flight status data in the manner described in more detail herein.

There are many types of touch screen sensing technologies, including capacitive, resistive, infrared, surface acoustic wave, and embedded optical. All of these technologies sense touch on a screen. A touch screen is disclosed having a plurality of buttons, each configured to display one or more symbols. A button as used herein is a defined visible location on the touch screen that encompasses the symbol(s). Symbols as used herein are defined to include alphanumeric characters (referred to herein as a label), icons, signs, words, terms, and phrases, either alone or in combination. A particular symbol is selected by sensing the application (touch) of a digit, such as a finger or a stylus, to a touch-sensitive object associated with that symbol. A touch-sensitive object as used herein is a touch-sensitive location that includes a button and may extend around the button. Each button including a symbol has a touch-sensing object associated therewith for sensing the application of the digit or digits.

The flight deck controller includes a gaze tracking controller 132, an emitter 134, and a sensor 136. The emitter 134 may, for example, be positioned on the head of the user for emitting a signal that is sensed by one or more sensors 136 positioned near the touch screen. The gaze tracking controller 132, in response to the sensed signal, communicates with the touch screen 102 to identify a portion of the touch screen being viewed. In other embodiments, it may not be necessary for a user to wear a device on the user's head.

As alluded to previously, embodiments described herein relate to systems and methods for reducing the effects of inadvertent touch of a control button on a TSC taking into consideration pilot point of gaze and the significance of the function or system operated by the control button.

In accordance with a first aspect, several embodiments for generating boundary values and determining the "attention" of the user (e.g. the pilot) using point of eye gaze will be presented.

In a first embodiment, the user gaze is bounded by a stochastic area around the button textual label on or associated with the TSC button. The label may be within the button or beyond the button boundary but associated with it. This imaginary boundary will vary from button to button depending on the number of letters, words, etc. on the label and their orientation. The user gaze should be within the boundary gaze to enable the button. Otherwise, the button remains disabled. The assumption is that if the user's gaze is focused within the boundary area, then the user has read the label associated with the button, and therefore, it is likely that the user understands the subsequent actions resulting from touching the button. This embodiment ensures that the user not only looks at the button, but also the label that describes the button's function.

Figure 2:
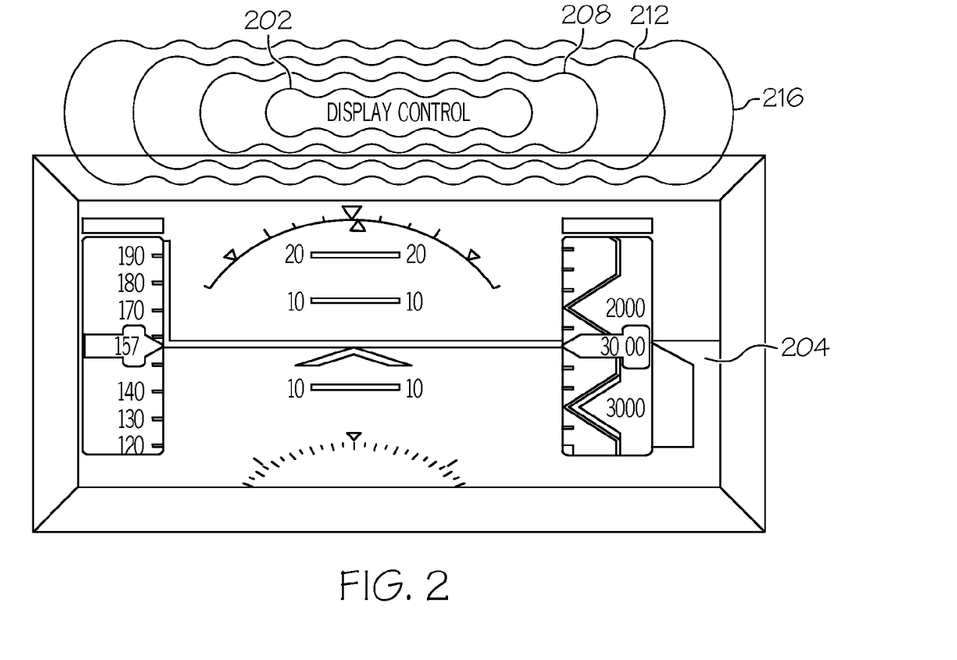
FIGS. 2 and 3 illustrate a first technique for determining eye gaze boundary areas in accordance with an embodiment.
Figure 3:
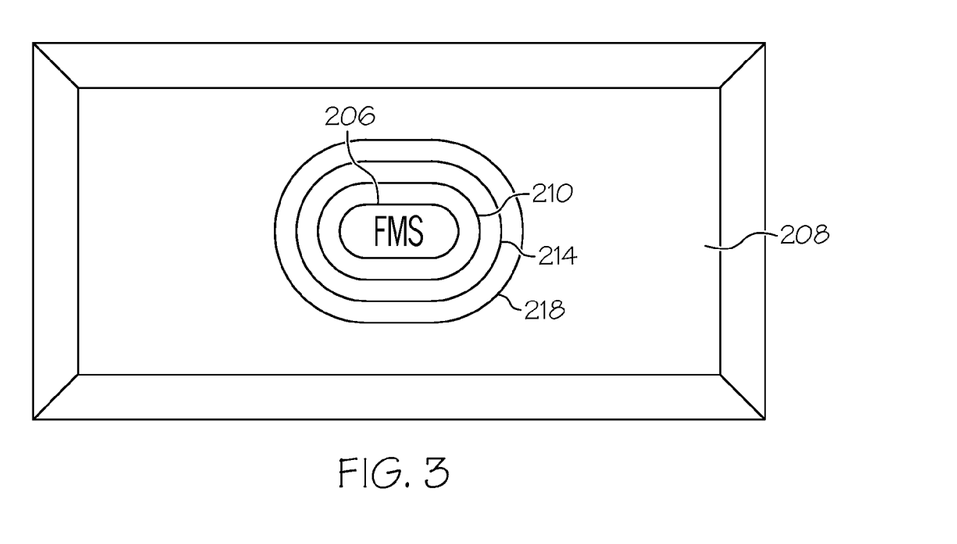

As stated previously, the gaze bounding area defined around the button may be modified based on the significance level of the button. If the significance of the button is high such that an inadvertent touch may have a serious effect on the flight, the imaginary stochastic geometric area defined may be such that it substantially exactly traces the boundary of the button label such as is shown by the area enclosed by line 202 in FIG. 2 (wherein the label "Display Control" is shown outside but associated with control button 204) and the area enclosed by line 206 in FIG. 3 (wherein the label "FMS" is shown on control button 208). If an inadvertent touch would have less of an impact on the flight, the imaginary stochastic area may be expanded by a first predetermined amount (e.g. an additional ten percent) as is denoted by area 208 in FIG. 2 and area 210 in FIG. 3. If the function is even less significant, the imaginary stochastic geometric area may be expanded by a second predetermined amount (e.g. an additional twenty percent) as indicated by areas 212 and 214 in FIGS. 2 and 3, respectively, and if even still less significant, by an additional third predetermined amount (e.g. forty percent) as indicated by area 216 in FIG. 2 and 218 in FIG. 3.

Figure 4:
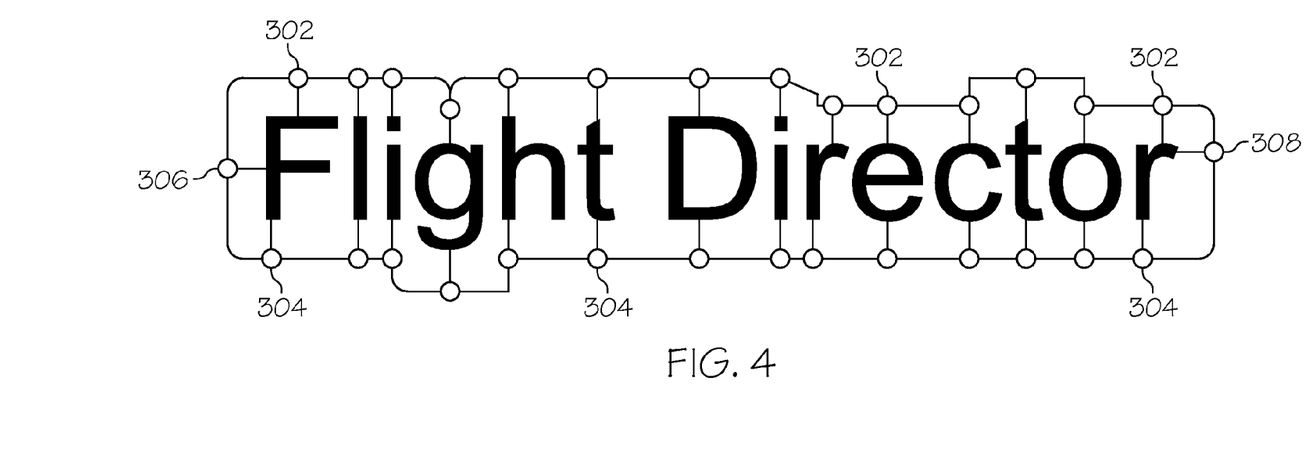
FIGS. 4 and 5 illustrate a first technique for determining eye gaze boundary areas in accordance with a further embodiment.
Figure 5:
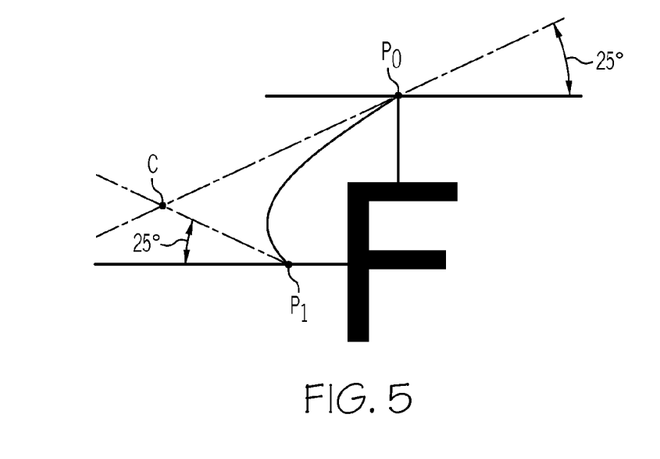

The imaginary stochastic bounding areas around a button label may be determined by first analyzing the TSC graphic user interface and identifying all control button labels. Next, for each letter in each label, an equidistant point above the highest point and below the lowest point in every letter is defined as shown, for example, at 302 and 304, respectively, in FIG. 4. In addition, (1) equidistant points to the left of the first letter in each line of the label, and (2) equidistant points to the right of the last letter in each line of the label are identified as shown at 306 and 308, respectively. The points defined around the label are then joined using a quadratic Bezier curve. That is, referring to FIG. 5, if $P_0$ and $P_1$ are two points around a letter in a label (in this case the letter "F"), a quadratic Bezier curve is defined by:

$$B(t)=(l-t)^2 P_0 + 2(l-t)tC + t^2 P_1$$

where $P_0$ and $P_1$ are points around the letters as described above, and C is the control point of the Bezier curve which forms at the intersection of a positive slope line and a negative slope line from the two points at a twenty-five degree angle with the horizontal as shown in FIG. 5.

In a second embodiment, user gaze is bound by a region (e.g. circular, rectangular, etc.) within the boundary of the touch screen control button. While this region is defined within the control button area, it will cover a sufficient enough area to permit the eye gaze to be within the boundary of the region to enable the button; otherwise, the control button is disabled. It is assumed that if the user's eye gaze is within the region's boundary, there is a high probability that the user has seen the button, understands the subsequent action associated with touching the button, and intends that action be performed.

Figure 6:
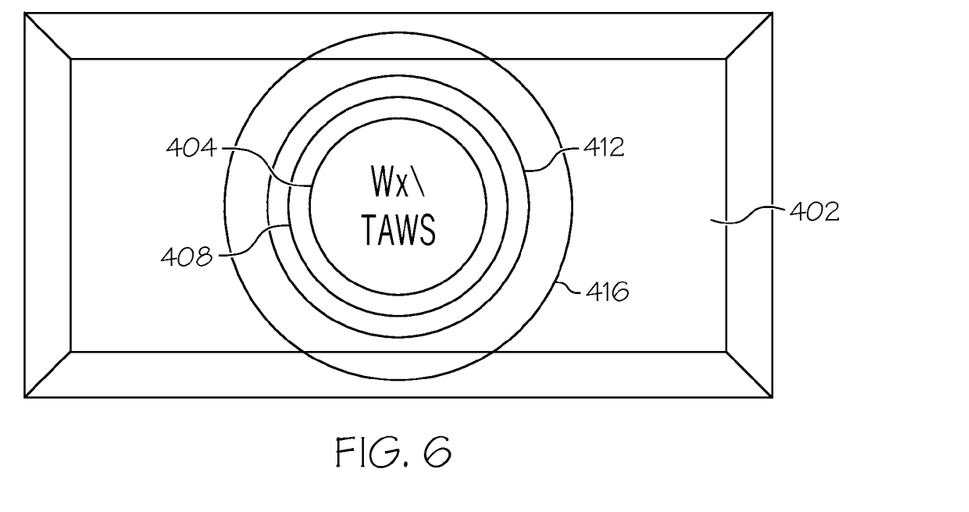
FIGS. 6 and 7 illustrate a second technique for determining eye gaze boundary areas in accordance with a still further embodiment.
Figure 7:
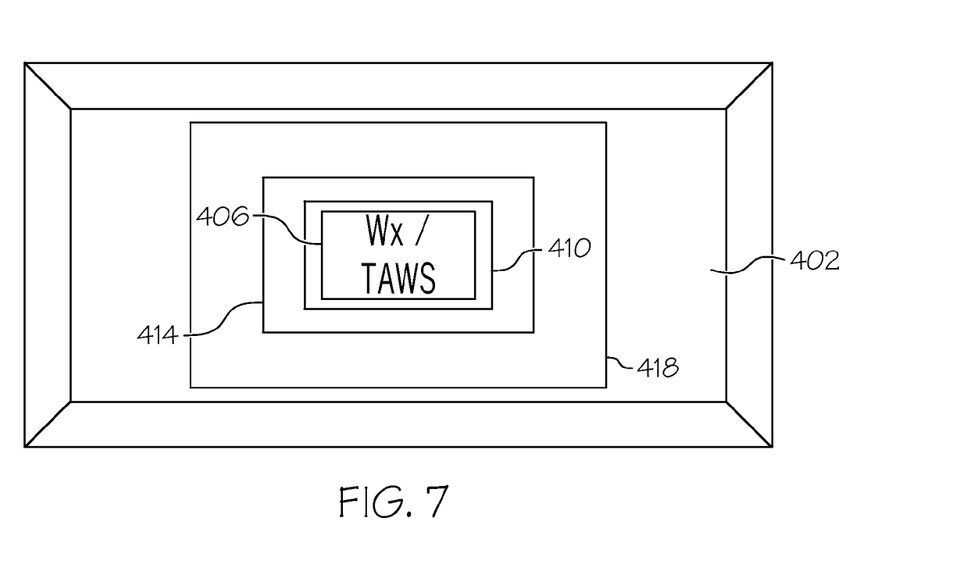

The gaze bounding area defined within the control button may be modified based on the significance level of the result of an inadvertent touch as previously described. Referring to FIGS. 6 and 7, if the significance of the control button 402 (Wx/TAWS) is high such that an inadvertent touch may have a serious effect on the flight, the circular 404 or rectangular 406 area defined may be a small area at the center of the control button 402 such as is shown by the areas enclosed by circle 404 in FIG. 6 and rectangle 406 in FIG. 7. If an inadvertent touch would give less of an impact on the flight, the imaginary area may be expanded by a first predetermined amount (e.g. an additional ten percent) as is denoted by circle 408 in FIG. 6 and rectangle 410 in FIG. 7. If the function is even less significant, the area may be expanded by a second predetermined amount (e.g. an additional twenty percent) as indicated by circle 412 in FIG. 6 and rectangle 414 in FIG. 7, even still less significant, the area may be increased by an additional third predetermined amount (e.g. forty percent) as indicated by area 416 in FIG. 6 and 418 in FIG. 7.

In a third embodiment, user gaze is defined by a dwell time on a defined area or point on the control button before the button is enabled. The boundary time is chosen to ensure that the user's attention at the point of gaze is guaranteed. Of course, the dwell time boundary should not exceed the flight deck avionics performance requirements and user machine interface requirements, but should be of sufficient length to assure that the control button has been looked at for a sufficient amount of time to indicate a high probability that the user understands the subsequent actions associated with touching the control button and that the user is intentionally touching it. It is to be noted that this method is not limited by label or button size and therefore can be used for all buttons on the TSC.

This embodiment may be implemented in conjunction with the first and second embodiments described above. That is, this embodiment requires that the user's eye gaze to be at a specified point on the control button (e.g. the center of the button) or within a specified area (e.g. the areas described in association with the first and second embodiments above or another area) for a specified amount of time referred to as dwell time. When the user's eye gaze is directed at the required location for the required dwell time, the system recognizes that there is a high probability that the pilot intends to perform the subsequent touch action, and the button can be enabled.

Figure 8:
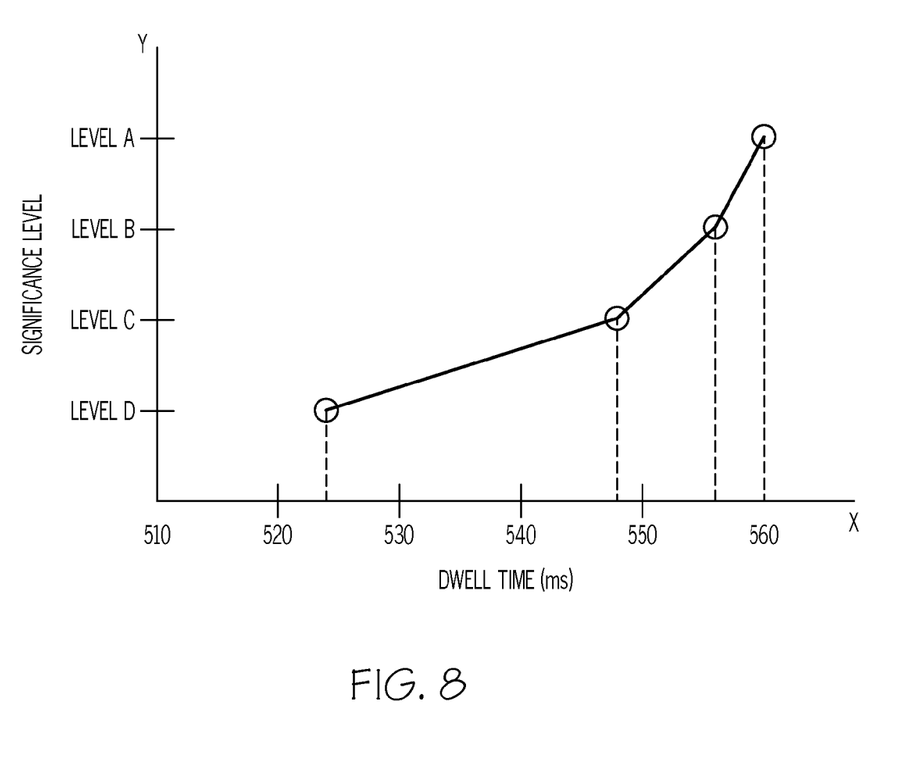
FIG. 8 is a graph of impact significance vs. eye gaze dwell time in accordance with yet another embodiment.

The eye gaze dwell time within a predefined area or point may be modified depending on the significance level of the control button. Referring to FIG. 8, which is a graph of significance of impact vs. dwell time, for example, if the control button is level-A highly significant control button such that an inadvertent touch might potentially have a significant impact on the continuation of the flight, the gaze dwell time might be Xms; e.g. 500 ms to 1,000 ms. If the control button is a level-B, significant control button, such that an inadvertent touch could have a severe impact on the continuation of the flight, the gaze dwell time might be X-0.1Xms. If the control button is a level-C, important button, such that an inadvertent touch could have a major impact on the continuation of the flight, the gaze dwell time might be X-0.2Xms before enabling the control button. Finally if the control button is a level-D, standard button, such that an inadvertent touch would have a minor impact on the continuation of the flight, then the gaze dwell time might be X-0.4Xms before enabling the control button.

It is further contemplated that the above described first aspect of bounding be adapted or modulated by the significance level of the function or avionics system operated by each of the TSC buttons. In fact, FAR (Federal Aviation Regulation) defines the significance of function based on the effect on the flight when the function or system fails as minor to potentially catastrophic. Thus, a methodology and system will be described to vary the gaze boundary to be more restrictive (in the spatial or time domain as the case may be) based on the significance of the function or avionics system operated by the button. The gaze boundary will have a tight boundary for highly significant buttons, and progressively looser boundaries for buttons of progressively decreasing significance, thus providing a high degree of safety.

Figure 9:
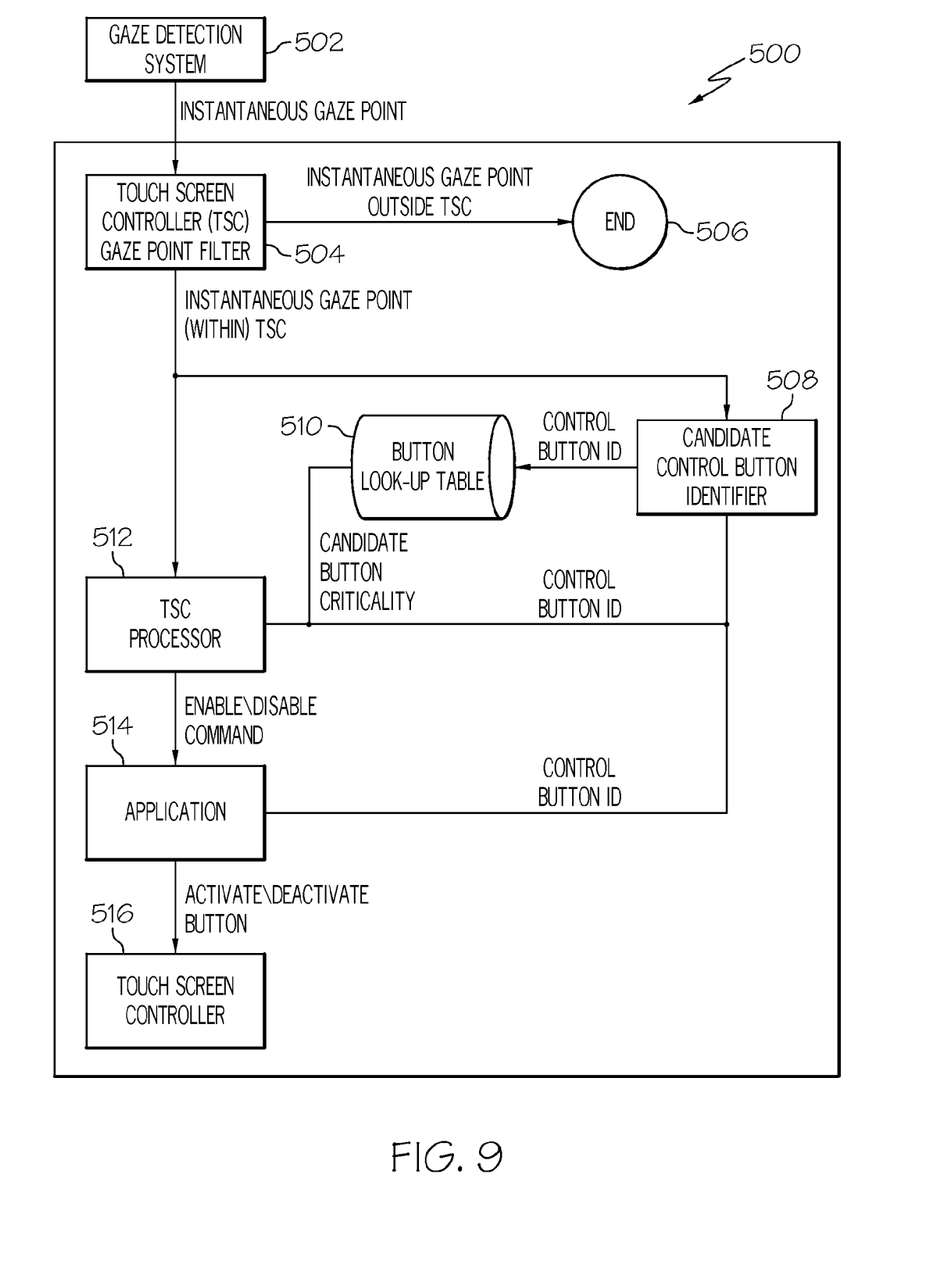
FIG. 9 is a block diagram of an adaptive touch screen controller system in accordance with an embodiment.

FIG. 9 is a block diagram of an adaptive touch screen controller (TSC) switching system 500 in accordance with an embodiment. A commercial, off-the-shelf, gaze detection system 502 of the type previously described provides the instantaneous gaze point to a TSC Gaze Point Filter 504. If the instantaneous gaze point is determined to be outside the TSC, the process ends as is indicated at 506. If within the TSC, the instantaneous gaze point is provided to an TSC processor. Candidate Control Button Identifier 508 receives the instantaneous gaze point data and estimates which button or group of buttons which may be activated or deactivated. That is, a rough estimate is made of which control button on the TSC is to be processed in the current cycle. A button is selected if the current gaze point is within a boundary associated with the button as described above. If the control buttons are closely spaced in a group as a whole (as, for example, in the case of an electronic keyboard), a boundary may be defined around the group as a whole and the entire group selected for activation if the gaze is within the boundary.

The candidate control button ID is provided to Button Significance Look-up Table 510, which provides a candidate button significance signal to TSC processor 512. The Federal Aviation Regulations have defined the significance of a function or avionics system based on the severity of the impact on a flight when the function or system fails. These significance levels range from minor (level-D) major (level-C), severe major (level-B), and catastrophic (level-A). Component 510 includes a look-up table wherein a significance level is assigned to every control button on the TSC. The significance level of a control button is equal to or greater than the significance level or design assurance level of the functionality of avionics system which the button operates. A sample look-up table is as follows:

| Button ID | Significance Level |
|---|---|
| B_001 | 1 |
| B_002 | 2 |
| B_003 | 3 |
| B_004 | 4 |
| B_005 | 4 |
| G_001 | 3 |
| G_002 | 3 | where: B_XXX is a control button ID, G_XXX is a group ID of a set of control buttons, and significant levels 1-4 correspond to DAL A-D of the function operated by each control button Button Look-up Table 510 will utilize the input control button ID to look up the significance level of the button and provides it to TSC processor 512. Candidate Control Button Identifier 508 also provides the control button ID to Processor 512 and to Application 514, which drives the button to activate or deactivate.

TSC processor 512 uses one or a combination of the above described methods to evaluate user intent to operate a touch screen control button. When the eye gaze meets any of the criteria proposed above, it may be assumed that the user is intentionally touching a particular control button and sends an "enable" command to Application 514. If the eye gaze does not meet the required criteria, the system assumes that the touch was unintentional and sends a "disable" command to Application 514.

Which of the three methods used to define the bounding area may be chosen as follows: (1) method one may be chosen when the button label is sufficiently large and high level of protection is desired (i.e. when the significance of the control button is high; (2) method two may be chosen when the button is large and a medium level of protection is desired (i.e. when the significance of the control button is moderate); and (3) method three may be chosen when defining a bounding area is difficult or inefficient. Application 514 then sends an activate/deactivate signal, as the case may be, to TCS 516.

Figure 10:
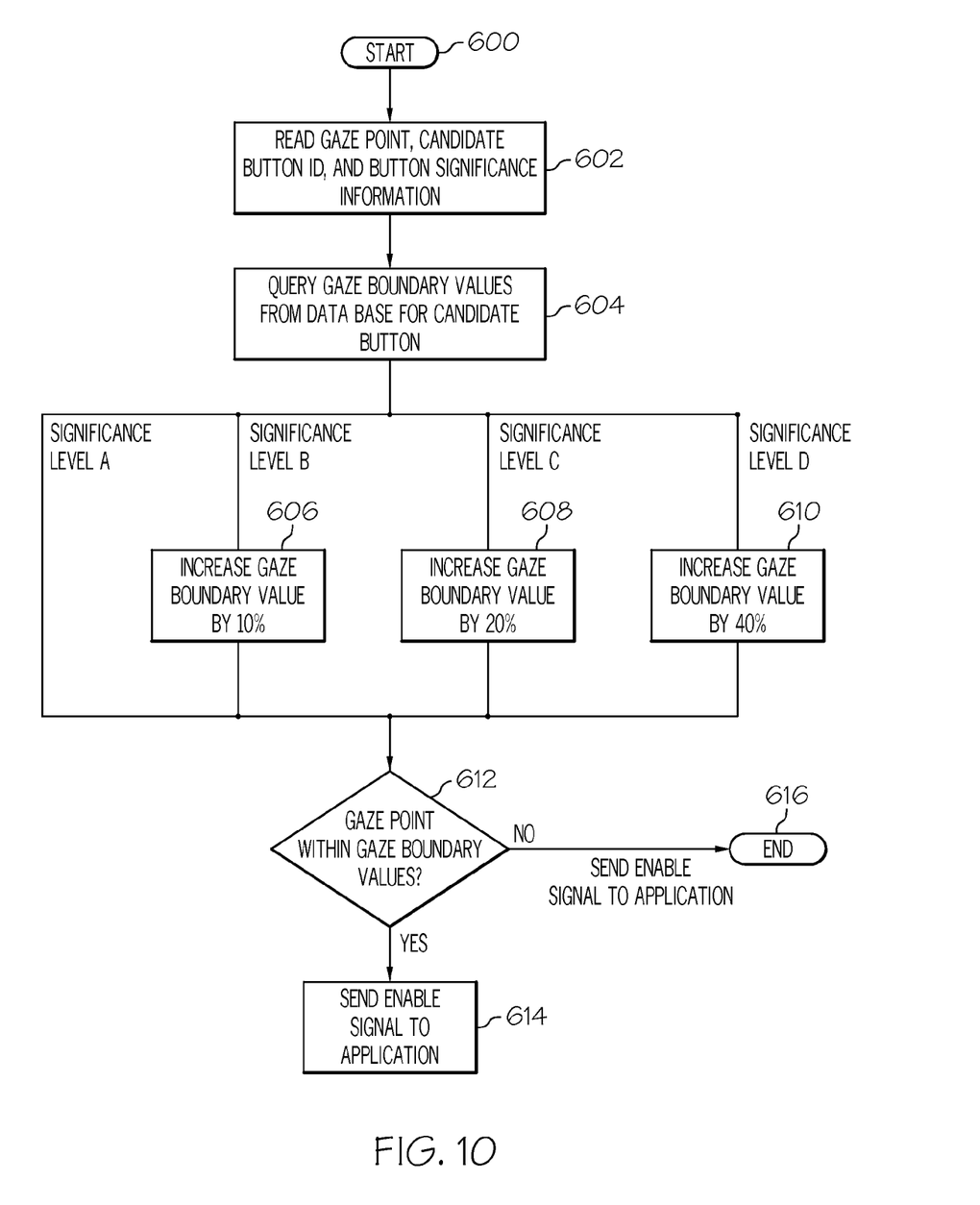
FIG. 10 is a flow chart describing a touch screen control algorithm suitable for use in conjunction with the system shown in FIG. 1.

FIG. 10 is a flow chart for describing the touch control button switch algorithm 600 carried out by adaptive touch screen controller switching system described in connection with FIG. 9. In STEP 602, TSC processor 512 receives data relating to the gaze point from gaze point filter 504, candidate button ID from control button identifier 508, and button significance from button significance look-up table 510. TSC processor 512 then queries the gaze boundary value (STEP 604) for the candidate button which was derived using any one or more of the three method described above using the highest significance level A and stored in a database. If the significance level is B, the gaze boundary values are increased by ten percent (STEP 606). If the significance level is C or D, the gaze boundary values are increased by twenty percent (STEP 608) and 40 percent (STEP 610), respectively. Next in STEP 612, if the gaze point is within the gaze boundary values, an enable signal is sent to application; otherwise, a disable signal is sent.

Thus, there has been provided an inadvertent touch rejection system and method that utilizes eye gaze data and the safety significance of the underlying function to mitigate the inadvertent touch in a manner that balances safety requirements and performance needs. The adaptive inadvertent touch rejection systems and methods utilize an eye gaze parameter filtered based on a defined area around the touch button that takes into consideration the significance of the function, thus increasing the protection for highly significant touch buttons as compared to less significant buttons.

What is claimed is:

1. A method executable by a processor for determining if a control button on a touch screen controller (TSC) was inadvertently touched, comprising:
    generating a gaze boundary for the control button that is (1) specific to the control button and (2) independent of a user's gaze point;
    determining the user gaze point;
    determining if the gaze point is within the gaze boundary;
    identifying the level of functional significance of the control button when the gaze point is within the gaze boundary;
    determining a gaze boundary area defined by the gaze boundary of the control button; and
    altering the gaze boundary area to reflect the level of functional significance.

2. A method according to claim 1, further comprising creating an enabling signal if the gaze point is within the gaze boundary.

3. A method according to claim 1, wherein the less the functional significance of the button is, the more the gaze boundary area is enlarged.

4. A method according to claim 3 wherein the control button may have a significance ranging from A to D, with A being the greatest and D being the least, and wherein the gaze boundary area of a control button is adjusted to reflect the significance of the control button.

5. A method according to claim 4 wherein the gaze boundary area of a B significance control button is increased by a first predetermined amount.

6. A method according to claim 5 wherein the gaze boundary area of a C significance control button is increased by a second predetermined amount that is greater than the first predetermined amount.

7. A method according to claim 6 wherein the gaze boundary area of a D significance control button is increased by a third predetermined amount that is greater than the second predetermined amount.

8. A method according to claim 7 wherein the first, second, and third predetermined amounts are substantially 10%, 20%, and 40% respectively.

9. A method according to claim 1, wherein the gaze boundary comprises a stochastic area around a control button label on or proximate the control button.

10. A method according to claim 1, wherein the gaze boundary comprises a geometric area within the control button.

11. A method according to claim 1, wherein gaze boundaries are defined, at least in part, by a predetermined dwell time on a predetermined location of the control button.

12. A system for determining if a user has inadvertently touched a control button of a touch screen controller, comprising:
    a gaze detection system that detects the user's gaze point;
    a control button identifier coupled to the gaze detecting system;
    a button significance look-up table coupled to the control button identifier; and a processor coupled to the gaze detection system, the control button identifier, and to the button significance lookup table, and configured to (1) generate a gaze boundary for the control button that is (i) specific to the control button and (ii) independent of a user's gaze point, (2) determine if the gaze point is within the gaze boundary, (3) identify the level of significance of the control button, and (4) alter an area bounded by the gaze boundary to reflect the level of functional significance of the button.

13. A method according to claim 12 wherein the processor is further configured to produce the gaze boundary as a stochastic boundary within the control button or associated therewith.

14. A system according to claim 12 wherein the processor is further configured to produce the gaze boundary as a geometric boundary area within the control button.

15. A system according to claim 12 wherein the processor is further configured to characterize the gaze boundaries based on a predetermined dwell time.

16. A method executable by a processor for determining if a control button on a touch screen controller (TSC) was inadvertently touched, comprising:
   generating a gaze boundary surrounding the control button that is (1) specific to the control button and (2) independent of a user's gaze point;
   determining the user gaze point;
   determining if the gaze point is within the gaze boundary;
   identifying the level of functional significance of the control button;
   determining a gaze boundary area defined by the gaze boundary of the control button;
   altering the gaze boundary area to reflect the level of functional significance; and
   creating an enabling signal if the gaze point is within the gaze boundary area.

17. A method according to claim 16, wherein the control button may have a significance ranging from A to D with A being the greatest and D being the least, and wherein altering the gaze boundary area of a B significance control button comprises increasing it by a first predetermined amount, altering the gaze boundary area of a C significance control button comprises increasing it by a second predetermined amount that is greater than the first predetermined amount, and altering the gaze boundary area of a D significance control button comprises increasing it by a third predetermined amount that is greater than the second predetermined amount.

18. A method according to claim 17, wherein the first, second, and third predetermined amounts are substantially 10%, 20%, and 40% respectively.

19. A method according to claim 16, wherein a gaze boundary comprises one or more of (1) a stochastic area around a control button label on or proximate the control button, (2) a geometric area within the control button, and (3) a predetermined dwell time on a predetermined location of the control button.

* * * * *